Oct. 29, 1957  F. J. KLANCNIK, JR  2,810,943
WIRE TYPE HOSE CLAMP
Filed Aug. 6, 1954

Inventor
Frank J. Klancnik, Jr.
By: Fred Gerlach
Atty.

United States Patent Office 2,810,943
Patented Oct. 29, 1957

2,810,943

WIRE TYPE HOSE CLAMP

Frank J. Klancnik, Jr., Chicago, Ill.

Application August 6, 1954, Serial No. 448,198

3 Claims. (Cl. 24—27)

The present invention relates generally to clamps. More particularly, the invention relates to that type of clamp which is designed primarily to clamp one end of a hose around one end of a conduit, is formed of a length of wire, has its central portion bent to form a loop for encircling the one end of the hose, has its end portions arranged in side-by-side relation and extending in opposite directions, has the extremities of its end portions bent outwards, and is provided with means whereby the end portions thereof may be forced away from one another in order to contract the loop and thus cause it firmly to clamp the one end of the hose around the one end of the conduit.

One object of the invention is to provide a hose clamp of the aforementioned type which is an improvement upon, and has certain inherent advantages over, previously designed clamps and is characterized by simplicity of design or construction and low cost of manufacture.

Another object of the invention is to provide a hose clamp of the type and character under consideration in which the means for forcing away from one another the end portions of the loop-forming length of wire is in the form of a zigzag piece of wire which is disposed outwards of said end portions, has its ends connected to the outwardly bent extremities of the end portions of the loop-forming length of wire, is arranged so that the zigzags thereof lie in a plane at right angles to the plane of the loop, is adapted when its zigzags are subjected to a squeezing action for flattening purposes to increase in length and hence force the end portions of the loop-forming length of wire away from one another for loop contracting purposes, and is formed of wire of the type that is resilient but will when sharply bent retain the bend to the end that its zigzags after being subjected to a squeezing action will tend to remain in the flattened condition into which they are squeezed.

A further object of the invention is to provide a hose clamp of the last mentioned character in which the ends of the zigzag wire piece are formed integrally with the outwardly bent extremities of the end portions of the loop-forming length of wire.

A still further object of the invention is to provide a hose clamp which is generally of new and improved construction, effectively and efficiently fulfills its intended purpose and is capable of being applied to, and removed from, a hose with ease or facility.

Other objects of the invention and the various advantages and characteristics of the present hose clamp will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views.

Figure 1:
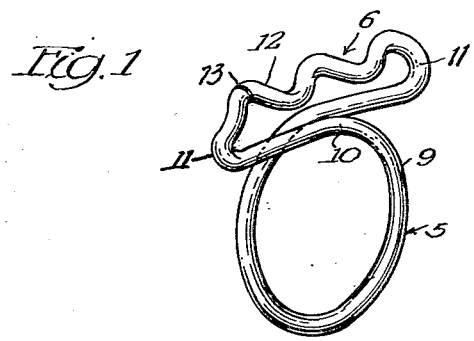
Figure 1 is a perspective of a hose clamp embodying the invention.
Figure 2:
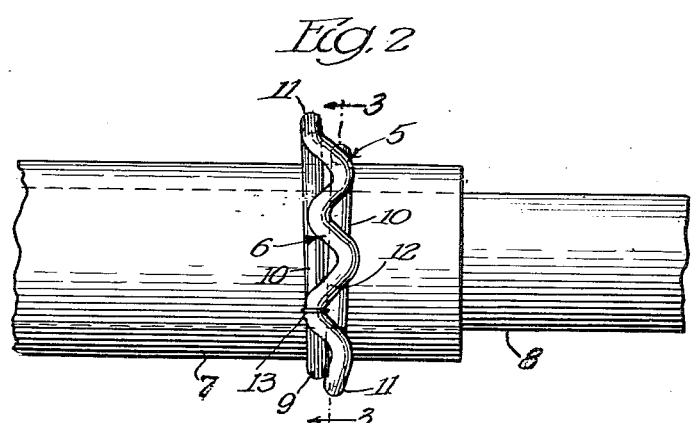
Figure 2 is a plan view showing the hose clamp after it has been applied to a hose around a conduit but before flattening of the zigzags of the zigzag wire piece for loop contracting purposes.
Figure 3:
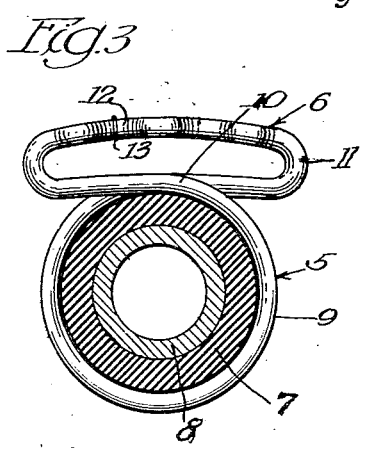
Figure 3 is a section taken on the line 3—3 of Figure 2 and showing the clamp before the loop is contracted around the hose.

The hose clamp that is shown in the drawing constitutes the preferred form or embodiment of the invention. It consists of a length 5 of wire and a zigzag wire piece 6 and serves as a medium or instrumentality for clamping one end of a hose 7 around one end of a conduit 8. It is contemplated that the hose 7 will be formed of rubber, rubberized fabric or any other compressible material. The conduit 8 is illustrated in the drawing as being a pipe nipple although it is to be understood that it may be any other tubular element through which fluid material is adapted to flow. The clamp when in its operative position serves to clamp and contract the one end of the hose around the one end of the conduit and thus form a fluid type joint or seal. The wire of which the length 5 and the piece 6 are formed is preferably circular in cross section. It is formed of any suitable metal and is of the type that is inherently resilient but will when sharply bent retain the bend.

The central portion of the wire length 5 is bent to form a circular loop 9. It is contemplated that normally the internal diameter of the loop 9 will be slightly greater than the external diameter of the hose 7. The end portions of the wire length 5 are designated in the drawing by the reference numeral 10 and are arranged so that they are in side-by-side relation and extend in opposite directions. Preferably, the end portions 10 are curved or arcuate in order to complete the loop 9. The extremities of the end portions 10 are designated by the reference numeral 11 and are bent at substantially right angles and so as to extend outwards.

The zigzag wire piece 6 is disposed a small distance outwards of the end portions 10 of the wire length 5 and is bent back and forth throughout substantially its entire length in order to form a series of zigzags 12. The latter are arranged so that they lie in a plane that is normal or at right angles to the plane of the loop 9. The ends of the zigzag wire piece 6 are connected to, and formed integrally with, the outer ends of the outwardly bent extremities 11. In order to contract the loop 9, it is contemplated that the zigzags 12 of the zigzag wire piece 6 will be partially flattened by subjecting them to a squeezing action. Such action may be obtained by pliers or any other jaw-type tool wherein the jaws are disposed in opposed relation and are arranged so as to move towards and away from one another in parallel relation. When the zigzags 12 of the zigzag wire piece 6 are partially flattened by subjecting them to a squeezing action, the length of the zigzag wire piece is increased. Any increase in length on the part of the zigzag wire piece 6 results in the end portions 10 being forced away from one another and effecting contraction of the loop 9. The degree of contraction of the loop 9 is dependent upon the extent to which the zigzags 12 are flattened. If the zigzags are flattened to a substantial extent, the loop 9 is contracted to a substantial extent. If the zigzags are flattened to a lesser extent, the amount of contraction of the loop is correspondingly lessened. Because of the character or physical properties of the wire of which the zigzag wire piece 6 is formed, the zigzags 12 after being flattened as hereinbefore pointed out tend to remain in their flattened condition and as a result the zigzag wire piece 6 will hold the loop 9 in its contracted position. The zigzag wire piece 6 is formed of two equal length sections and has the abutting or adjoining ends of the sections thereof connected together by welding as at 13.

Figure 4:
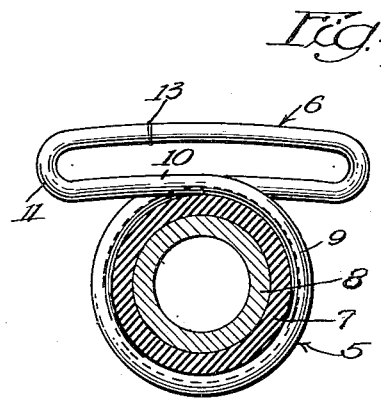
Figure 4 is a similar section except that it shows the zigzag wire piece after it has been elongated or extended as the result of flattening of the zigzags thereof by a squeezing action.

In connection with use of the clamp, it is contemplated that the loop 9 will be slid into encircling relation with the hose 7 before the conduit 8 is inserted into the hose. After the conduit 8 is inserted into the hose, the clamp is manipulated so that the loop 9 surrounds the end of the hose that extends around the inserted end of the conduit. After the clamp is properly manipulated or positioned, the zigzags 12 of the zigzag wire piece 6 are squeezed for flattening purposes. Flattening of the zigzags operates, as previously pointed out, to elongated or extend the length of the piece 6 and resultantly to contract the loop 9. It is contemplated that the zigzags 12 will be flattened until the loop 9 is contracted to such an extent that it causes the hose 7 to be firmly clamped around the conduit 8 as shown in Figure 4 of the drawing. Removal of the clamp from the hose 7 may be effected in either of two ways. Firstly, the zigzag wire piece 6 may be severed at the weld 13 or any other place along its length. After the severing operation, it is contemplated that the severed sections of the wire piece will be manipulated into laterally offset relation and pulled towards one another so as to move the end portions 10 of the wire length 5 towards one another. Such movement on the part of the end portions 10 results in expansion of the loop 9. Secondly, the zigzag wire length 6 may be bowed or flexed outwards by applying a suitable pry to the central portion of the piece. In connection with outward bowing or flexing of the piece 6, the end portions 10 are caused to move together thereby resulting in desired expansion of the loop 9.

The herein described hose clamp is essentially simple in design and may be produced at an extremely low cost. It effectively and efficiently fulfills its intended purpose and this is directly attributable to the fact that it includes the zigzag wire piece 6 as the means or medium for effecting contraction of the loop 9.

The invention is not to be understood as restricted to the details set forth since these may be modified within the scope of the appended claims without departing from the spirit and scope of the invention.

Having thus described the invention what I claim as new and desire to secure by Letters Patent is:

1. As a new article of manufacture, a clamp adapted to extend around a hose and clamp the latter on a conduit and comprising a length of wire having the central portion thereof bent to form a circular, hose encircling loop the internal diameter of which is originally greater than the external diameter of the hose, and having its end portions arranged in side-by-side relation, extending in opposite directions and provided with outwardly bent extremities, and a zigzag piece of wire disposed outwards of the end portions of the length of wire, having its ends connected directly to said outwardly bent extremities, and adapted when its zigzags are subjected to a squeezing action for flattening purposes to increase in length and hence force said end portions away from one another and effect contraction of the loop into firmly clamped relation with the hose, said zigzag piece being formed of wire that is resilient but will when sharply bent retain the bend to the end that its zigzags after being subjected to a squeezing action for loop contracting purposes will tend to remain in the flattened condition into which they are squeezed and thus substantially positively hold the loop in its contracted position.

2. As a new article of manufacture, a clamp adapted to extend around a hose and clamp the latter on a conduit and comprising a length of wire having the central portion thereof bent to form a circular, hose encircling loop the internal diameter of which is originally greater than the external diameter of the hose, and having its end portions arranged in side-by-side relation, extending in opposite directions and provided with outwardly bent extremities, and a zigzag piece of wire disposed outwards of the end portions of the length of wire, having its ends connected directly to said outwardly bent extremities, arranged so that the zigzags thereof lie in a plane at right angles to the plane of the loop and adapted when its zigzags are subjected to a squeezing action for flattening purposes to increase in length and hence force said end portions away from one another and effect contraction of the loop into firmly clamped relation with the hose, said zigzag piece being formed of wire that is resilient but will when sharply bent retain the bend to the end that its zigzags after being subjected to a squeezing action for loop contracting purposes will tend to remain in the flattened condition into which they are squeezed and thus substantially positively hold the loop in its contracted position.

3. As a new article of manufacture, a clamp adapted to extend around a hose and clamp the latter on a conduit and comprising a length of wire having the central portion thereof bent to form a hose encircling loop the internal diameter of which is originally greater than the external diameter of the hose, and having its end portions arranged in side-by-side relation, extending in opposite directions and provided with outwardly bent extremities, and a zigzag piece of wire disposed outwards of the end portions of the length of wire, having its ends connected to, and formed integrally with, said outwardly bent extremities and adapted when its zigzags are subjected to a squeezing action for flattening purposes to increase in length and hence force said end portions away from one another and effect contraction of the loop into firmly clamped relation with the hose, said zigzag piece being formed of wire that is resilient but will when sharply bent retain the bend to the end that its zigzags after being subjected to a squeezing action for loop contracting purposes will tend to remain in the flattened condition into which they are squeezed and thus substantially positively hold the loop in its contracted position.

References Cited in the file of this patent

UNITED STATES PATENTS

| | | |
|---|---|---|
| 282,466 | Preston | July 31, 1883 |
| 1,904,727 | Hanh | Apr. 18, 1933 |
| 2,472,172 | Ovens et al. | June 7, 1949 |